United States Patent
Arntson et al.

[11] 3,907,326
[45] Sept. 23, 1975

[54] OCCUPANT KNEE RESTRAINT

[75] Inventors: Gary L. Arntson, Lansing; Lehman J. Connell, Frankenmuth, both of Mich.

[73] Assignee: General Motors Corporation, Detroit, Mich.

[22] Filed: July 28, 1972

[21] Appl. No.: 276,084

[52] U.S. Cl. ............................ 280/150 B; 180/90
[51] Int. Cl.² ........................................ B60R 21/00
[58] Field of Search .... 280/150 B, 150 AB; 180/90; 74/493

[56] References Cited
UNITED STATES PATENTS

| | | | |
|---|---|---|---|
| 2,966,952 | 1/1961 | Wilfert | 180/90 |
| 3,341,248 | 9/1967 | Barenyi | 180/90 |
| 3,439,769 | 4/1969 | Brilmyer | 180/90 |
| 3,498,402 | 3/1970 | Barenyi | 180/90 |
| 3,641,128 | 10/1971 | Sobkow | 180/90 |
| 3,702,081 | 11/1972 | Arntson | 74/492 |
| 3,702,706 | 11/1972 | Sobkow | 280/150 AB |

FOREIGN PATENTS OR APPLICATIONS

| | | | |
|---|---|---|---|
| 1,115,317 | 12/1955 | France | 280/150 B |

Primary Examiner—Kenneth H. Betts
Assistant Examiner—J. Rubenstein
Attorney, Agent, or Firm—Herbert Furman

[57] ABSTRACT

A vehicle includes an instrument panel and an energy absorbing steering column having a forward portion rigidly secured to the body and a rearward portion slidably connected by energy absorbing structure to the forward portion for movement under impact. A rigid bracket structure on the vehicle is releasably secured to a column bracket structure which is secured to the rearward portion of the column and moves therewith. The rigid bracket structure guides movement of the column bracket structure during forward movement of the rearward portion of the column. A knee panel depends from the instrument panel and includes a center portion which partially surrounds the rearward portion of the column and driver knee deformable side portions to each side of the center portion. The knee panel is comprised of a metal back plate covered with foam and an outer decorative covering. A bracket anchors the center portion to the rigid bracket structure. Upper and lower brackets connect the upper and lower edges of the side portions to the vehicle.

6 Claims, 10 Drawing Figures

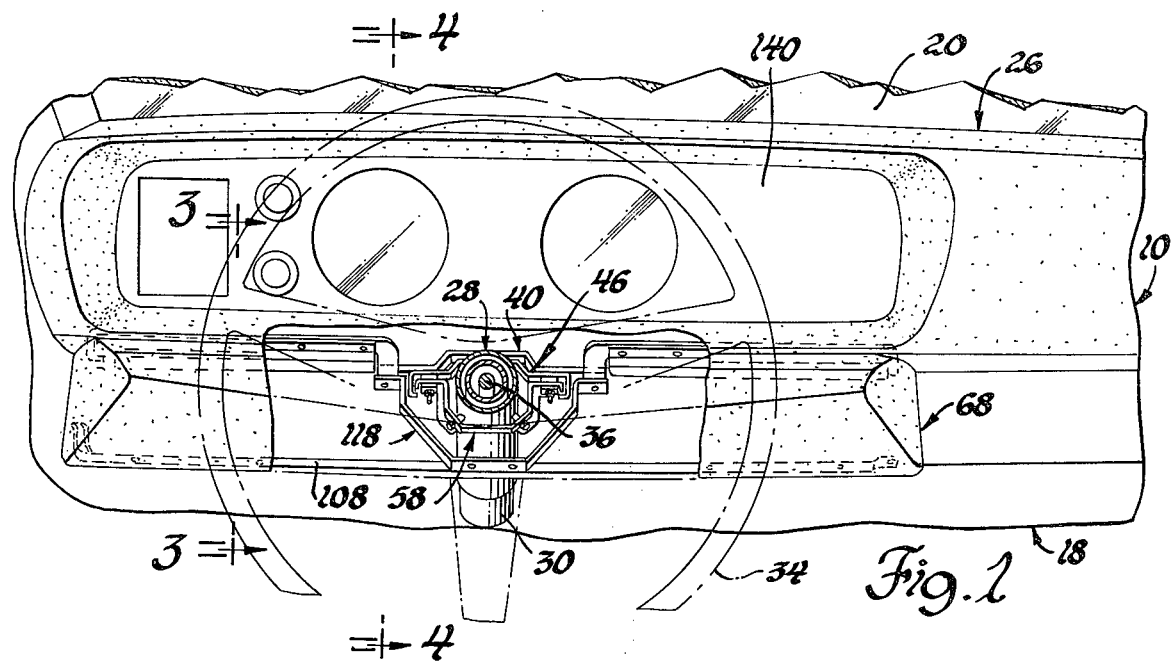
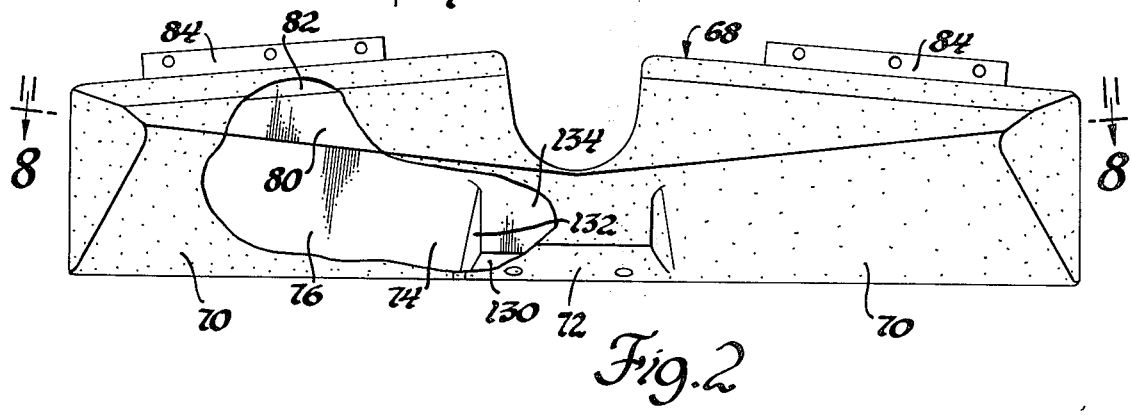
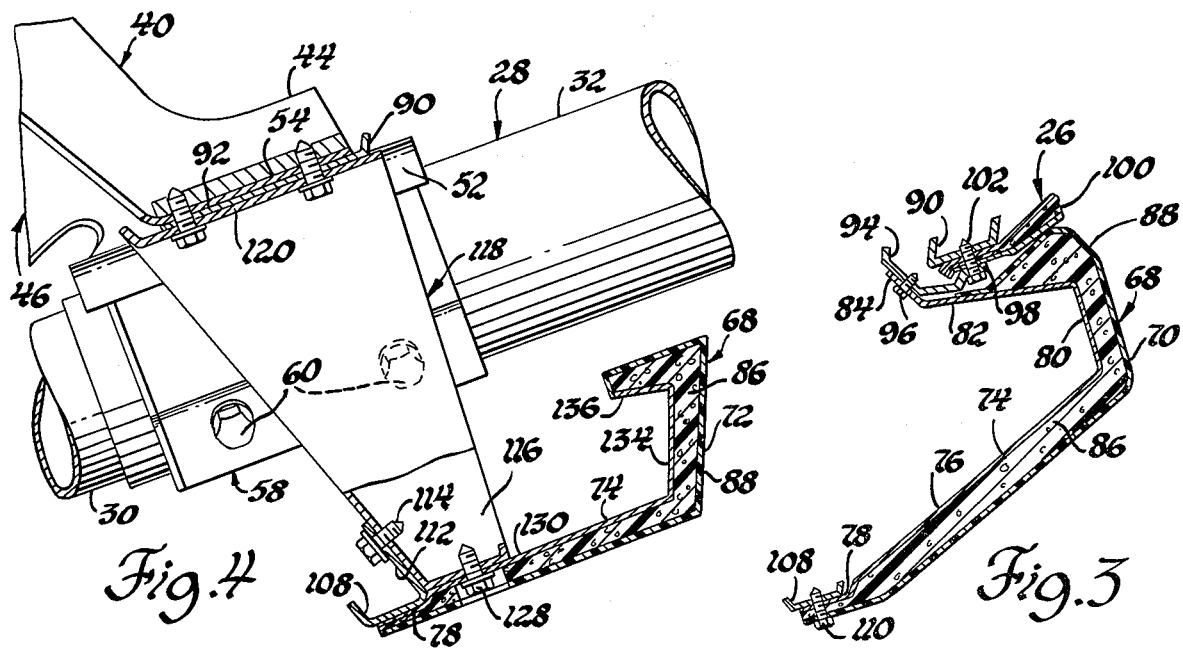

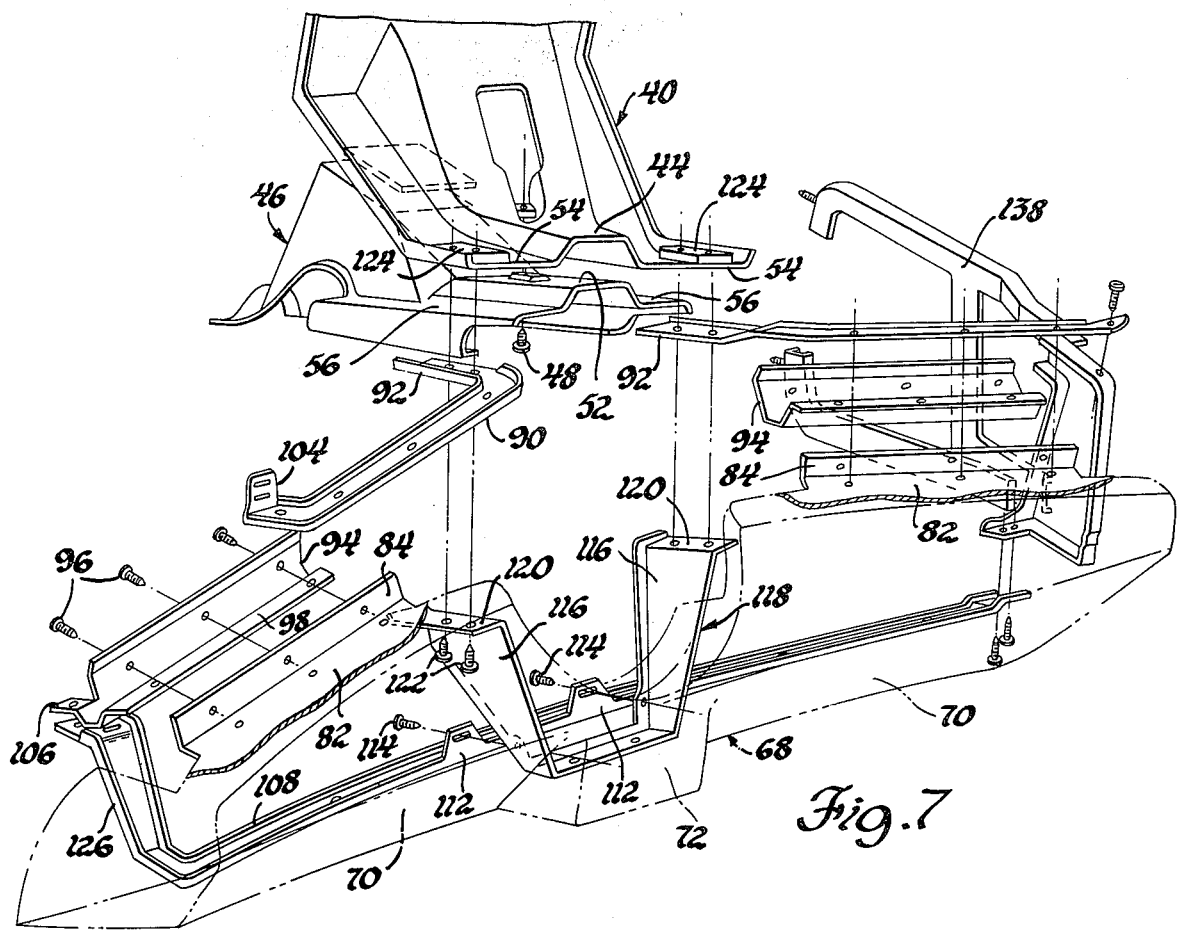
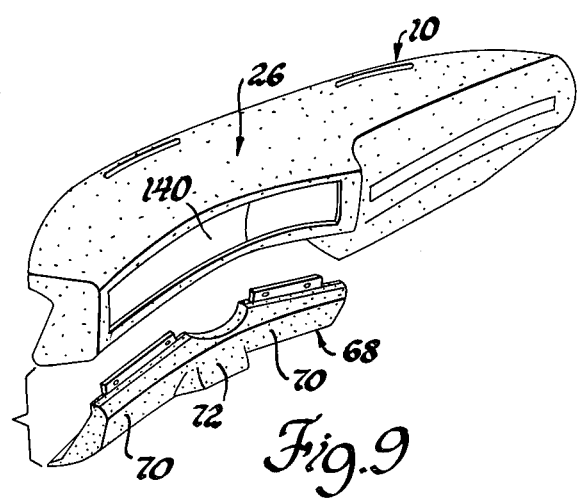 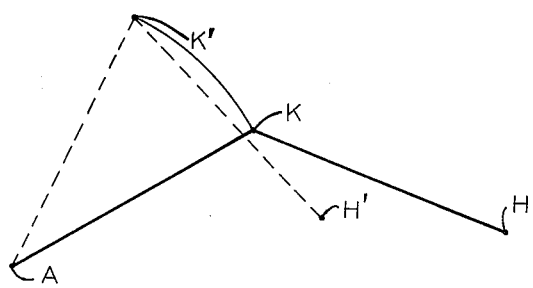

OCCUPANT KNEE RESTRAINT

This invention relates generally to a vehicle occupant knee restraint and more particularly to a deformable knee restraint for seated vehicle occupants.

The knee restraint in its preferred embodiment extends downwardly from the lower edge of the instrument panel opposite the driver and includes a center portion and a pair of driver knee deformable side portions. The center portion partially surrounds the rearward or movable portion of an energy absorbing steering column and is secured to a rigid bracket structure mounted on a forward wall of the body to block deformation of the center portion into the column due to any engagement thereof by the driver'knees. The side portions extend to each side of the center portion and are deformed by engagement with the driver's knees to absorb the kinetic energy and apply a resultant compressive load longitudinally of the femurs of the driver to control driver kinematics or movement with respect to the column. The upper and lower edges of the side portions are also anchored to the rigid bracket structure and secured to other fixed body structure to ensure the desired kinetic energy absorption by deformation thereof, and the application of the desired resultant loads thereby to the driver's knees when impacted to control driver kinematics.

One feature of this invention is that it provides a knee restraint for seated vehicle occupants which absorbs kinetic energy of such occupants under impact conditions and also controls the kinematics of such occupants with respect to occupant energy absorbing means. Another feature of this invention is that the restraint includes knee deformable portions located to each side of an energy absorbing steering column for engagement by the knees of the driver to absorb part of the kinetic energy of movement of the driver under impact conditions while applying a resultant compressive load within limits longitudinally of the femurs of such driver to control his kinematic movement with respect to the column. A further feature of this invention is that the resultant load aids in controlling both H point movement and movement of the upper torso about the H point. Yet another feature of this invention is that the deformable portions are connected by a center portion which partially surrounds the energy absorbing steering column and is rigidly anchored to a forward body wall to block any deformation of the center portion into the column should it be engaged by the driver's knees. Yet a further feature of this invention is that the knee deformable side portions have their upper and lower edges reinforced by bracket structures which tie to the rigid anchor of the center portion and to other fixed vehicle structure to ensure the energy absorption deformation thereof by the driver's knees and the application thereby of the desired resultant compressive loads longitudinally of the driver's femurs.

These and other features of the invention will be readily apparent from the following specifications and drawings wherein:

FIG. 1 is an elevational view which is partially broken away and shows an occupant knee restraint according to this invention;

FIG. 2 is an enlarged view of a portion of FIG. 1;

FIG. 3 is an enlarged sectional view taken generally along the plane indicated by line 3—3 of FIG. 1;

FIG. 4 is an enlarged sectional view taken generally along the plane indicated by line 4—4 of FIG. 1;

FIG. 7 is a partially broken away, blown apart perspective view of a portion of FIG. 1;

FIG. 8 is a sectional view taken generally along line 8—8 of FIG. 2;

FIG. 9 is a view showing the relationship of the knee restraint to the instrument panel; and FIG. 10 is a kinematic diagram.

Figure 6:
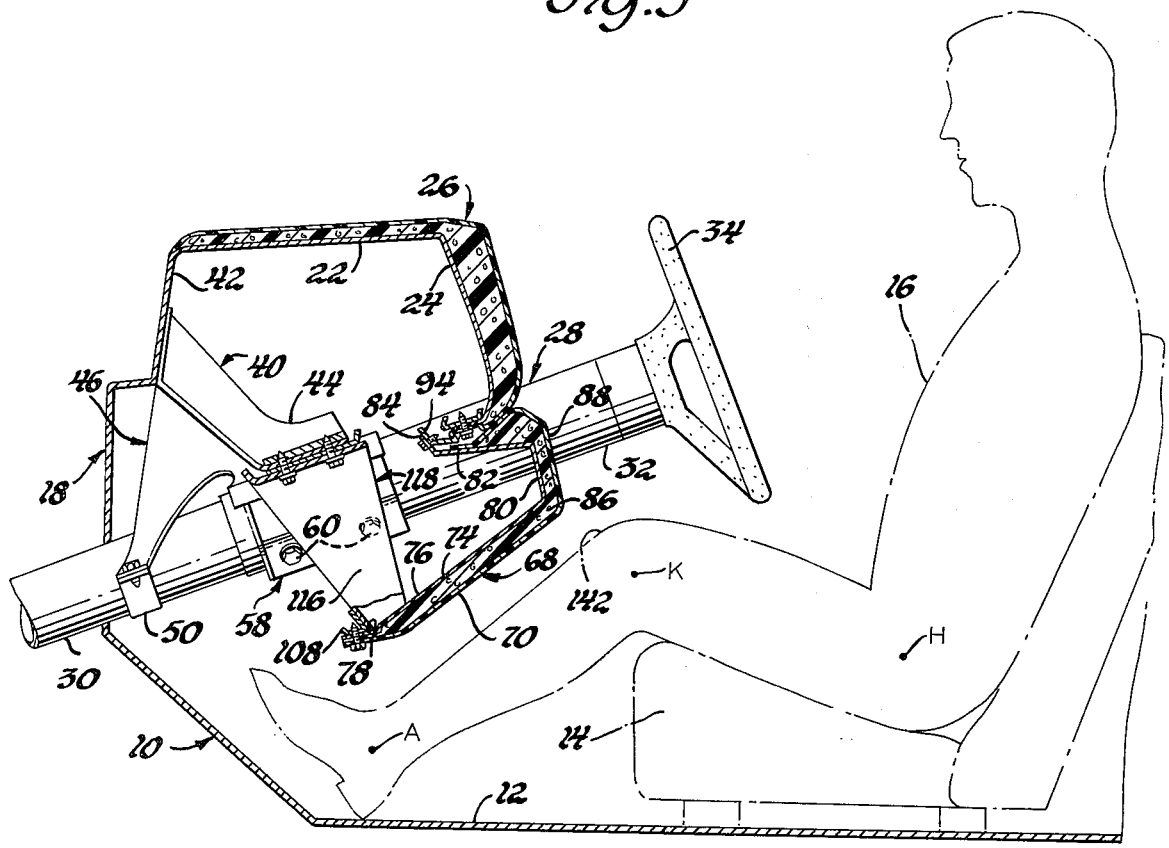
FIG. 6 is a view similar to FIG. 4 and showing the relationship of the driver to the knee restraint.

Referring now to FIGS. 1 and 6, a vehicle designated generally 10 includes a floor pan 12 which supports a schematically indicated conventional front seat 14 for supporting the vehicle driver 16 in seated attitude. The vehicle likewise includes a forward wall 18 which is conventionally known as a fire wall or cowl structure and a windshield 20 which extends upwardly and rearwardly of the vehicle. An upper wall portion 22 and a rear wall portion 24, formed integrally with the remainder of wall 18, provide the instrument panel 26 of the body. The instrument panel is conventionally covered with suitable energy absorbing material and an outer decorative covering.

The vehicle 10 further includes an energy absorbing steering column assembly 28. The assembly 28 is the same as that disclosed in detail in copending application Ser. No. 173,493 Arntson, filed Aug. 20, 1971, now U.S. Pat. No. 3,702,081, and assigned to the assignee of this invention. Only a brief description of the column necessary for an understanding of this invention will therefore be given.

The assembly 28 includes a forward portion 30 which is rigidly secured at its lower end to a portion of the wall 18. The assembly 28 further includes a rearward portion 32 which is telescopically related, as shown, to the portion 30 and is adapted for movement axially thereof and forwardly of the body during collapse of the column when loaded by the driver 16. The column portions 30 and 32 are interconnected by suitable means which normally maintains them against relative telescopic movement and absorbs energy during such movement. A conventional steering wheel 34 is rotatably mounted on the column portion 32 and is secured to the conventional steering mechanism of the body by a steering shaft 36 shown in FIG. 5. Also as shown therein, a shift tube 38 concentrically surrounds the shaft 36 to connect the shift lever mechanism with the transmission.

Figure 5:
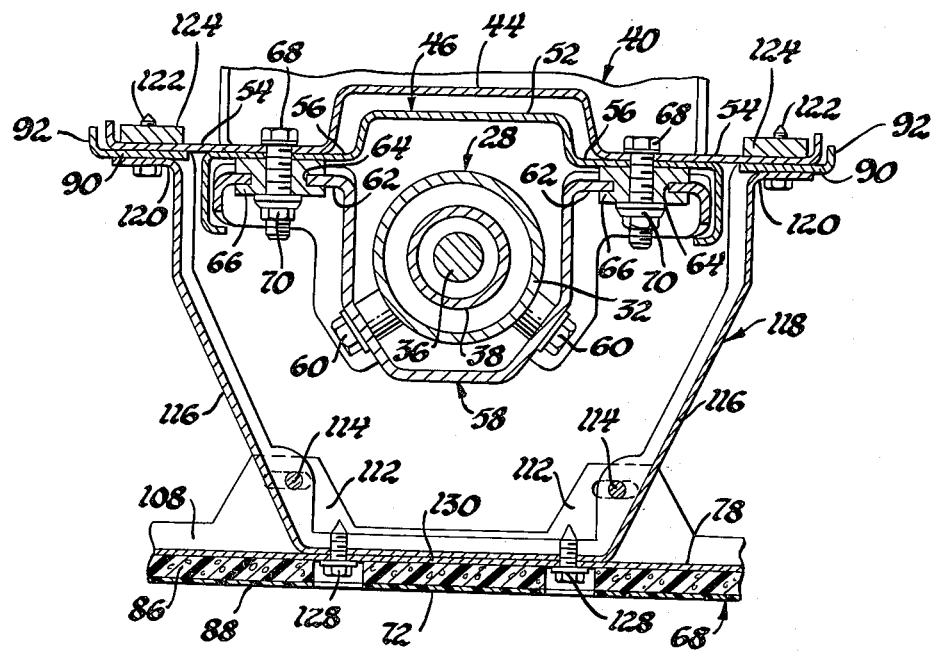
FIG. 5 is an enlarged view of a portion of FIG. 1.

A steering column support bracket 40 has its forward end rigidly secured to a wall portion 42 of wall 18 adjacent the wall portion 22. The rearward end portion of the bracket 40 is offset and shaped to provide a flattened generally U-shaped portion 44, FIGS. 4 and 7, which spans the portion 32 of the steering column assembly 28. A steering column guide bracket 46 is bolted at 48, FIG. 7, to bracket 40, and secured at 50 to column portion 30 to support this column portion on wall 18. The rearward offset portion 52 thereof is shaped in generally the same manner as the portion 44 of bracket 40 and fits therewithin in spaced relationship, as shown in FIG. 5, except for their respective abutting lateral flanges 54 and 56 to each side of the column portion 32. The abutting flanges are provided with aligned apertures. A generally U-shaped bracket 58, FIG. 5, is suitably bolted at 60 to the column portion 32 and includes lateral flanges 62 which are slotted at 64, with the slots 64 being closed at their forward ends with respect to the body and open at their rearward ends with respect to the body. A side slotted mounting capsule 66 is slidably received in each of the slots 64 and is releasably secured to a respective flange 62 by a series of plastic shear pins, not shown, which may be injection molded within aligned apertures in the capsules and in the flanges. Each capsule includes a closed slot. A bolt 68 extends through the aligned apertures in the abutting flanges 54 and 56 of the bracket portions 44 and 52 and the closed slots in each capsule 66 and is retained by a nut 70 to support the column portion 32 on the forward wall 18 of the body.

When the steering wheel 34 is engaged by the upper torso of the driver 16 with a predetermined force, the resultant load is transferred from the steering wheel to the upper column portion 32 through the hub of the steering wheel. When the component of this load which is directed axially of the column reaches a predetermined minimum magnitude, the plastic shear pins which interconnect the flanges 62 and the capsules 66 are fractured and the column portion 32 is thereby released for movement axially of the column portion 30 as the energy absorbing means connecting the column portions functions to absorb the energy of the axial load. During such movement, the bracket 58 moves with the column portion 32 and the flanges 62 slide along and are guided by the bracket portion 52 of bracket 46 after the flanges are released from the slots of the capsules.

It can be seen from FIG. 5 that flanges 62 are provided with side extensions which are received within generally L-shaped side extensions of flanges 56 to control movement of column portion 32 laterally or downwardly of column portion 30.

From the foregoing description, it can be seen that the performance of the steering column 28 is dependent upon the axial component of the impact load applied to the column by the driver. It is therefore desirable that this load be applied coaxially of the column or with minimum deviation therefrom. In order to accomplish this, the kinematics of the driver 16 should be such that the upper torso of the driver rotate in a forward direction relative to the vehicle about the H point or hip axis indicated in FIG. 6 and that the lower torso of the driver move only a limited distance forwardly of the seat 14, such as 8 to 10 inches of H point movement, whereby the driver remains on the seat and maximum rotation of his torso about the H point will occur.

It is known that each femur of a person is capable of taking compressive loads up to 1400 pounds if this load is applied axially of the femur. With respect to FIG. 6, it can be seen that if such compressive load is applied axially of the femurs of the driver during the duration of the impact of the driver's knees with the knee restraint, it will aid in producing maximum forward rotation of the upper torso of the driver about the H point and aid in positioning the upper torso so that it will apply an impact load generally coaxially of the column 28.

With reference to FIG. 10, the H point or hip axis of the driver is indicated by the letter H, the K point or knee axis is indicated by the letter K, and the A point or ankle axis is indicated by the letter A. It is assumed that the driver's legs are laterally aligned so that the H, K and A points of the driver's legs are coaxial. The full lines connecting the H, K and A points indicate the normal seated position of the driver under nonimpact conditions. The driver's feet are normally located adjacent the toe pan portion of wall 18 as shown in FIG. 6. Although his feet may move slightly forwardly under impact conditions, the A points can be considered relatively stationary during such conditions. Under impact conditions, the lower legs of the driver swing forwardly and upwardly of the vehicle about the A points so that the K points move from K to K'. The upper leg portions of the driver concurrently move forwardly and upwardly of the vehicle so that the H points move to H' and the angularity of the axes K-H of the femurs decreases with respect to the axes K-A of the lower leg portions. The distance between H and H' should normally be within the range of 8 to 10 inches as previously mentioned. The engagement of the frontal surfaces of the knees of the occupant with the knee restraint should be such that the resultant compressive load is applied axially of the femurs of the upper leg portions of the occupant or coaxially of the dash line connecting the points K' and H'. It can be seen that such a resultant compressive load will aid in producing maximum forward rotation of the upper torso of the driver about the H point as it moves from H to H'.

The occupant knee restraint of this invention is engageable by the frontal surfaces of the knees of the driver to absorb as much of the driver's kinematic energy as possible by impact deformation and to also apply a resultant compressive load longitudinally of the femurs of the driver within predetermined limits to thereby control the attitude of the driver with respect to the steering column as previously set forth and in turn ensure maximum performance of such column. The knee restraint is located so as to be engaged by the knees of the driver very early under impact conditions to approach an instantaneous squaring of the resultant load versus time curve and maintain square wave efficiency at 1400 pounds for the duration of the impact. This will restrict movement of the lower torso of the driver relative to the seat and produce the desired rotation of the upper torso as soon as possible and in the appropriate direction. Thus the energy absorbing steering column collapse will absorb a major part of the impact load applied by the driver's torso to the column since the load will be applied substantially coaxially of the column.

The knee restraint includes a center portion which partially surrounds the upper portion 32 of the column and a pair of side portions. The center portion is rigidly supported by the brackets 40 and 46 to ensure that if any accidental deformation of this center portion by the driver's knees should occur, it cannot be deformed into the column portion 32 to thereby restrict movement of this column portion relative to the column portion 30 and in turn detract from the overall performance of the column. The side portions of the knee restraint have their upper edges secured to the lower edge of the instrument panel 26, with this securement being reinforced by tie bars which extend laterally of the body from the brackets 40 and 46. The tie bar for the side portion to the left of the column is tied to the hinge pillar while the tie bar for the upper edge of the right-hand side portion can extend through an additional knee panel for the front seat occupants to the right-hand hinge pillar or can be tied to the forward wall 18 through a suitable bracket. A tie bar is also provided for the lower edge of the knee restraint and the center portion. By anchoring the upper and lower edges of the side portions of the knee restraint, deformation of the restraint is ensured.

Generally the restraint includes a formed metal base or back having side portions capable of energy absorption with square wave efficiency typical of a rigid low density foam. The base is covered with a layer of soft foam material which in turn is covered with an outer decorative covering. The soft foam material absorbs normal impacts of the occupant's knees, those not involving contact of the vehicle with an obstacle sufficient to produce column collapse. Additionally, the foam material provides for load distribution over the metal base under non-normal impacts and aids in "pocketing" the driver's knees to control lateral sliding movement relative to the knee restraint. The outer decorative covering is preferably of vinyl or a material having similar tensile strength so as to obtain a "hammock" effect and aid the foam material in distributing the load over the metal base. It also aids the foam material in "pocketing" the driver's knees to reduce lateral sliding movement relative to the knee restraint. The side portions have frontal surfaces which are located in generally parallel relationship to the frontal surfaces of the driver's knees. The pocketing of the driver's knees ensures that the load vectors are directed axially of the femurs of the driver.

Surveys have shown that the distance between the frontal surfaces of a driver's knees and the knee restraint remains fairly constant regardless of the height, weight, or percentile of the driver since the length of the lower torso determines the position of the seat and the driver's feet are restricted in position by the vehicle controls. The distance between either knee and the steering column centerline increases as either the height or weight of the driver increases. In a 50th percentile male, this distance or "knee spread" is approximately 7 inches.

The knee restraint 68 of this invention generally includes a pair of knee deformable side portions 70 interconnected by a center portion 72. The knee restraint is symmetrical about the axis of the center portion which is coplanar with the axis of the steering column 28 and accordingly only the left-hand side portion will be described in detail and it will be understood that the right-hand side portion is of like construction, unless otherwise stated.

As best shown in FIGS. 4 and 8, the knee restraint includes a formed metal base or back 74 which is preferably of 0.035 inch steel capable of energy absorption with square wave efficiency for the duration of the impact of the driver's knees with the side portions 70 of the restraint. While other materials may be used, such materials should also be able to maintain square wave efficiency at 1400 pounds per femur during the duration of the impact of the driver's left knee against side portion 70 of the knee restraint. The side portion 70 as shown in FIGS. 4 and 6 includes a knee-engageable first frontal wall or part 76 angled to the vertical and having an offset attachment flange 78 to the lower edge thereof. A second frontal wall 80 extends angularly to wall 76 and to the vertical and merges into an upper wall 82 which terminates in an offset attachment flange 84 for a portion of the extent thereof. Only the wall 76 of the knee restraint is normally engaged by the driver's left knee. It is normally engaged intermediate the upper and lower junctures thereof with wall 80 and flange 78 respectively. The base 74 is covered with approximately one-half inch of a soft foam material 86, such as foam urethane or foam vinyl. This foam material absorbs very little energy under impact conditions other than normal. Its primary purposes are to aid in distributing the load over the wall 76 and to aid in pocketing the driver's knee as previously mentioned. The foam material terminates short of the termination of wall 82 and is of reduced thickness over the offset flange 78. The foam material is covered with an outer decorative covering 88, preferably of a supported vinyl fabric or similar material which blends colorwise and aesthetically with the interior of the vehicle. The upper edge of the covering is cemented to wall 82, FIG. 6, and the lower edge is cemented to the foam opposite flange 78. Other materials than vinyl fabric may be used provided they have the tensile strength of vinyl fabric since this creates a so-called hammock effect as previously mentioned. The foam material 86 and covering 88 thus aid each other in distributing the load over the wall 76 and in pocketing the driver's knee. It should also be remembered that the foam material and covering absorb the energy of normal impacts or engagement of the driver's knee with the knee restraint under loads less than those requiring deformation of wall 76 in order to absorb the kinetic energy of the driver.

With reference to FIG. 7, an upper generally J-shaped instrument panel tie bar 90 is of channel cross section and has an inboard leg 92 engaging the flange 54 of the portion 44 of bracket 40. As shown in FIG. 5, the inner wall of the leg 92 is cut away so that this leg of the tie bar can nest underneath the flange 54. As shown in FIGS. 4 and 7, a flange of an offset knee restraint upper tie bar 94 nests against the offset flange 84 of wall 82 and is secured thereto by a plurality of sheet metal screws 96 extending through the flange of the tie bar 94 and the flange 84. Another offset flange 98 of the tie bar 94 nests against the lower edge 100 of the instrument panel, FIG. 6, and a plurality of sheet metal screws 102 extend through aligned openings in the tie bar 90 and in the tie bar 94 to secure the upper edge of portion 70 and the lower edge of the instrument panel to the tie bars 90 and 94 and in turn rigidly anchor them to the bracket 40, as will be described.

The outboard leg of the bracket 90 includes an upwardly offset slotted ear 104 which is bolted to suitable bracket structure mounted on the A pillar of the body. An apertured ear 106 of tie bar 94 nests underneath and is bolted to the outboard leg of the tie bar 90 to further secure these together adjacent their outboard ends. A knee restraint lower tie bar 108 of channel cross section extends along the lower edge of the knee restraint as shown in FIGS. 1, 4 and 7. The base of tie bar 108 nests against the flange 78 of wall 76 and is secured thereto at a number of places 110. The rearward leg of tie bar 108 is provided with a pair of slotted ears 112, FIGS. 5 and 7, which are secured at 114 to flanged legs 116 of a U-shaped bracket 118. Flanges 120 of the legs 116 bear against respective legs 92 of the tie bar 90, FIG. 4, and bolts 122 extend through aligned apertures in the flanges 120, legs 92, and flanges 54 and are received within tapped blocks 124 welded to the flange 54 to thereby rigidly anchor the tie bars 90, 94 and 108 to the bracket 40.

The outboard left-hand end of the tie bar 108 is offset upwardly at 126 as shown in FIG. 7 and is bolted to suitable bracket structure mounted on the A pillar of the body. This bracket structure may be the same as that for the bars 90 and 94.

The base of bracket 118 is bolted at 128, FIG. 4, to the lower wall 130 of the center portion 72 of the knee restraint. Wall 130 is a continuation of flange 78 and merges into wall 76 through side wall 132, FIG. 2. It also merges into forward wall 134 which terminates in an arcuate flange 136 which defines an arcuate opening receiving the portion 32 of column 28. The center portion 72 is thus of boxlike shape and may provide a housing for an air conditioning outlet if desired. The center portion is covered with the foam material 86 and covering 88 as shown in FIG. 4. The bracket 118 surrounds the portion 32 of the column 28 as shown in FIG. 4 and is located within the center portion 72. It can be therefore seen that it is virtually impossible for the center portion 72 of the knee restraint to be deformed into the steering column due to engagement of the driver's knees therewith. Thus, the overall performance of the column cannot be influenced by any deformation of the knee restraint.

The left-hand tie bars 90 and 94 rigidly anchor the upper edge of the left-hand side portion 70 of the knee restraint to the bracket 40 and in turn are anchored at their outboard ends to the A pillar of the vehicle, which is a fixed body structure. The lower edge of the left-hand side portion 70 is anchored to the bracket 118 and also to the A pillar. Thus, the left-hand side portion 70 has its upper and lower edges rigidly anchored to fixed vehicle body structure so that any engagement thereby by the driver's knee will result in energy absorption deformation of wall 76 rather than deformation of the instrument panel or release of the knee panel from the instrument panel and the fixed vehicle body structure.

The right-hand side portion 70 is anchored to the brackets 40 and 118 in the same manner as the left-hand side portion 70 by like numbered tie bars 90 and 94 and the right-hand continuation of tie bar 108. The right-hand ends of the tie bars 90 and 108 may either be secured to additional tie bars which carry them through a knee panel for the right-hand front seat passenger or may be secured to the forward wall 18 of the body by suitable bracket structure, such as the bracket 138 indicated in FIG. 7.

Although the portions 70 are angled with respect to each other and to the center portion 72 when viewed in plan, this results from the shape of the instrument cluster area 140 of the panel 26, as shown in FIG. 9, and is not necessary.

FIG. 6 shows the relationship of the frontal surface 142 of the left-hand knee of the driver 16 to the frontal surface left-hand side portion 70 of the knee restraint. It will be noted that the surface 142 of the driver's knee is located generally parallel to the frontal surface of portion 70 and to wall 76 of the knee restraint. This occurs even though the side portion 70 is slightly angled as previously noted. The spacing of the knee to the knee restraint will vary with driver percentile and may range from approximately 1¾ inches up to 3½ inches. Preferably the spacing should be kept as minimum as possible since it is desirable to instantaneously square the resultant load versus time curve which results from engagement of the driver's knee with the portion 70 of the knee restraint in order to absorb as much of the driver's kinetic energy as possible. However, such instantaneous squaring of the curve would require instantaneous contact of the driver's knee with the knee restraint. This is not possible when considering the percentile range of drivers. The square wave efficiency should be maintained at 1400 pounds during the duration of the impact of the driver's knee with the knee restraint. Such impact may result in a deformation of the wall 76 from approximately 1½ inches for a fifth percentile male to as much as 3½ inches for a 95th percentile male.

To briefly summarize, when the frontal surface 142 of the driver's left-hand knee, engages the left-hand side portion 70 of the knee restraint, the covering 88 and the foam material 86 cooperatively aid each other in pocketing the driver's knee to control any sliding movement of the driver's knee with respect to the left-hand side portion. It is assumed that the A point remains stationary or that any movement thereof will have occurred prior to engagement of the frontal surface of the driver's knee with the knee restraint, as previously mentioned. If the kinetic energy of the lower torso of the driver is within certain predetermined limits, no deformation, of course, of the wall 76 will occur and when the lower torso rebounds with respect to the seat 14, the covering 88 and the foam material 86 will resume their initial shape. If the kinetic energy exceeds certain limits, then the frontal surface 142 of the driver's knee will engage the wall 76 through the covering 88 and the compressed portion of the foam material 86 between the frontal surface and the wall 76 and deform this wall. This deformation will, of course, absorb the kinetic energy of the lower torso of the driver to limit the H point movement to the range H-H' indicated in FIG. 10 as the knee point moves from K to K' about an arc generated about the relatively stationary A point. The resultant K'-H' will be directed substantially coaxially of the femur of the driver's lower torso and the resultant compressive load will control the kinetics of the upper torso of the driver about the point H' to position the upper torso with respect to the axis of the column 28. The degree of deformation of wall 76 will, of course, vary with the percentile of the occupant and the inertial force of the occupant's body. Assuming a 30 mph front barrier impact, a knee impact velocity of 12 mph, and that the knee restraint exhibits square wave energy absorbing characteristics, a fifth percentile driver will deform wall 76 approximately 1½ inches, a 50th percentile driver will deform the wall approximately 2½ inches, and a 95th percentile will deform the wall approximately 3⅓ inches. The respective lower torso weights were assumed to be 47 pounds, 75½ pounds, and 100 pounds, and the effective weights were assumed to be 20% less. These figures can be calculated from the formula $$P_T = \frac{E_{KT}}{L}$$

where $E_{KT}$ is the kinetic energy according to the formula $$\frac{W_E V^2}{2G}$$

and $L$ is the applied load with square weight of efficiency, $W_E$ is the effective weight and $V$ is the knee impact velocity.

From the foregoing description, it can be seen that this invention provides an occupant knee restraint for seated vehicle occupants which absorbs kinetic energy of movement of the occupant by impact deformation of the restraint by the occupant's knees and which also controls the kinematics of the occupant to position the upper torso of the occupant with respect to energy absorbing structure therefor, such as an energy absorbing steering column, to ensure adequate performance of such structure. The knee deformable portions of the particular driver knee restraint disclosed herein are connected by a center portion which is rigidly anchored to fixed vehicle body structure to ensure that no deformation of the deformable portions will detract from the overall column performance. Likewise, the upper and lower edges of the deformable portions are anchored to fixed vehicle body structure to ensure that as much energy absorption as possible takes place through impact deformation of these portions and that the resultant compressive loads are applied axially of the driver's femurs and are within a predetermined limit.

We claim:

1. The combination comprising, an automotive vehicle including an occupant compartment having an instrument panel, an energy absorbing steering column assembly engageable by the upper torso of a seated driver for controlled collapse thereof, a knee restraint including first portions capable of absorbing energy by plastic deformation and located to each side of the steering column for engagement by the frontal surfaces of the knees of the driver, and a center portion interconnecting the first portions and at least partially surrounding the energy absorbing column, the plastic deformation of the first portions by the frontal surfaces of the driver's knees absorbing kinetic energy of the lower torso of the driver and applying a resultant compressive load longitudinally of the femurs of such driver within predetermined tolerance limits to control the kinematics of the upper torso of the driver with respect to the steering column assembly, means rigidly supporting the center portion on the vehicle to block deformation of the center portion into the column assembly, and means interconnecting edge portions of the first portions of the knee restraint and fixed vehicle structure to insure plastic deformation of the first portions intermediate said edge portions.

2. The combination comprising, an automotive vehicle including an occupant compartment having an instrument panel, an energy absorbing steering column assembly engageable by the upper torso of a seated driver and including a first portion adapted to be mounted to the body and a second portion collapsible relative to the first, first column support means rigidly mounting the first portion to the body, releasable means securing the second portion to the first portion, a knee restraint including first portions capable of absorbing energy by plastic deformation and located to each side of the steering column for engagement by the frontal surfaces of the knees of the driver, and a center portion interconnecting the first portions and at least partially surrounding the energy absorbing column, the plastic deformation of the first portions by the frontal surfaces of the driver's knees absorbing kinetic energy of the lower torso of the driver and applying a resultant compressive load longitudinally of the femurs of such driver within predetermined tolerance limits to control the kinematics of the upper torso of the driver with respect to the second portion of the column assembly, means interconnecting the center portion and the first column support means to block deformation of the center portion into the column assembly due to engagement thereof by the driver's knees, and means interconnecting edge portions of the first portions of the knee restraint and fixed vehicle structure to insure plastic deformation of the first portions intermediate said edge portions.

3. The combination comprising, an automotive vehicle including an occupant compartment having an instrument panel, an energy absorbing steering column assembly engageable by the upper torso of a seated driver for controlled collapse thereof, a knee restraint including plastically deformable first portions located to each side of the steering column assembly for engagement by the frontal surfaces of the driver's knees and a center portion interconnecting the first portions and at least partially surrounding the energy absorbing column, the first portions having upper edge portions and lower edge portions and being plastically deformed upon engagement by the frontal surfaces of the driver's knees intermediate their said upper edge portions and their said lower edge portions to absorb kinetic energy of the lower torso of the driver and to apply a resultant compressive load longitudinally of the femurs of such driver within predetermined tolerance limits to control the kinematics of the upper torso of the driver with respect to the column assembly, means rigidly supporting the center portion on the vehicle to block deformaion thereof into the column due to engagement thereof by the driver's knees, and means interconnecting the upper and lower edge portions of the first portions of the knee restraint and fixed vehicle structure to reinforce said edge portions and ensure plastic deformation of the first portions intermediate said edge portions.

4. The combination comprising, an automotive vehicle including an occupant compartment having an instrument panel, an energy absorbing steering column assembly engageable by the upper torso of a seated driver for controlled collapse thereof, a knee restraint including plastically deformable first portions located to each side of the steering column assembly for engagement by the frontal surfaces of the driver's knees and a center portion interconnecting the first portions and at least partially surrounding the energy absorbing column, the first portions being plastically deformed upon engagement by the frontal surfaces of the driver's knees intermediate their upper edge portions and their lower edge portions to absorb kinetic energy of the lower torso of the driver and to apply a resultant compressive load longitudinally of the femurs of such driver within predetermined tolerance limits to control the kinematics of the upper torso of the driver with respect to the column assembly, means rigidly supporting the center portion on the vehicle to block deformation thereof into the column and possible interference with column collapse, means interconnecting the upper and lower edge portions of the first portions of the knee restraint and the rigid support means, and means interconnecting the upper and lower edge portions of the knee restraint and fixed vehicle body structure, the interconnecting means reinforcing said edge portions and ensuring plastic deformation of the first portions intermediate said edge portions.

5. The combination comprising, an automotive vehicle including an occupant compartment having an instrument panel, an energy absorbing steering column assembly including a first portion adapted to be mounted on the body and a second portion engageable by the upper torso of a seated driver for controlled collapse thereof relative to the first portion, column support means rigidly securing the first portion to the body, a knee restraint including plastically deformable first portions located to each side of the steering column assembly for engagement by the frontal surfaces of the driver's knees and a center portion interconnecting the first portions and at least partially surrounding the energy absorbing column, the first portions being plastically deformed upon engagement by the frontal surfaces of the driver's knees intermediate their upper and lower edge portions to absorb kinetic energy of the lower torso of the driver and to apply a resultant compressive load longitudinally of the femurs of such driver within predetermined tolerance limits to control the kinematics of the upper torso of the driver with respect to the column assembly, first means interconnecting the center portion and the column support means to block deformation of the center portion into the column and possible interference with column collapse, second means interconnecting the upper edge portions of the first portions of the knee restraint and the column support means, third means interconecting the lower edge portions of the knee restraint and the first means, and fourth means interconnecting the upper and lower edge portions of the knee restraint and fixed vehicle body structure, the interconnecting means reinforcing said edge portions and ensuring plastic deformation of the first portions intermediate said edge portions.

6. The combination comprising, an automotive vehicle including an occupant compartment having an instrument panel, an energy absorbing steering column assembly engageable by the upper torso of a seated driver for controlled collapse thereof, a knee restraint including first portions capable of absorbing energy by plastic deformation and located to each side of the steering column for engagement by the frontal surfaces of the knees of the driver, and a center portion interconnecting the first portions and at least partially surrounding the energy absorbing column, the plastic deformation of the first portions by the frontal surfaces of the driver's knees absorbing kinetic energy of the lower torso of the driver and applying a resultant compressive load longitudinally of the femurs of such driver within predetermined tolerance limits to control the kinematics of the upper torso of the driver with respect to the steering column assembly, means rigidly supporting the center portion on the vehicle to block deformation of the center portion into the column assembly, and means interconnecting edge portions of the first portions of the knee restraint and fixed vehicle structure to insure plastic deformation of the first portions intermediate said edge portions, the knee restraint first portions each including a plastically deformable base, a first layer of elastically deformable material, and a second thinner layer of elastically stretchable material, the first and second layers providing pocketing of the driver's knees with respect to the bases.

* * * * *